(12) United States Patent
Eng

(10) Patent No.: US 8,070,435 B1
(45) Date of Patent: Dec. 6, 2011

(54) SPLIT RING WEDGE BEARING DAMPER

(75) Inventor: Jesse Eng, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 528 days.

(21) Appl. No.: 12/405,563

(22) Filed: Mar. 17, 2009

(51) Int. Cl.
*F01D 25/00* (2006.01)

(52) U.S. Cl. ........ 415/229; 416/174; 384/517; 384/538; 384/563

(58) Field of Classification Search .......... 415/110–113, 415/229; 416/174; 384/99, 462, 473, 476, 384/517, 535, 538, 563, 581
See application file for complete search history.

(56) References Cited

U.S. PATENT DOCUMENTS

| | | | |
|---|---|---|---|
| 3,003,836 A | 10/1961 | Hill | |
| 3,738,719 A | 6/1973 | Langner | |
| 3,940,192 A | 2/1976 | Hagele | |
| 4,166,659 A | 9/1979 | Gleichman | |
| 4,279,451 A | 7/1981 | Heldt | |
| 4,486,055 A | 12/1984 | Rohloff | |
| 4,676,667 A | 6/1987 | Komatsu et al. | |
| 4,699,528 A | 10/1987 | Gotman | |
| 4,923,313 A | 5/1990 | Bergling | |
| 5,205,384 A | 4/1993 | Heshmat | |
| 5,228,787 A | 7/1993 | Lawson | |
| 7,431,504 B1 * | 10/2008 | Pelfrey | 384/99 |
| 7,452,135 B1 | 11/2008 | Holsaple | |
| 7,740,441 B1 * | 6/2010 | Huber et al. | 415/112 |
| 7,748,952 B1 * | 7/2010 | Schopf et al. | 415/116 |
| 2010/0220948 A1 * | 9/2010 | Singh et al. | 384/477 |

* cited by examiner

*Primary Examiner* — Matthew Landau
*Assistant Examiner* — Joseph C Nicely
(74) *Attorney, Agent, or Firm* — John Ryznic

(57) ABSTRACT

A split ring wedge bearing friction damper for an aero engine that allows the engine to operate without an oil tank, a pump, and a lubricant cooler, the friction damper having a damper ring and a wedge ring that both have wedge surfaces in contact so that an axial load can be applied to the bearing outer race to provide damping to the bearing, and so that the damper ring can also have a radial displacement to produce a radial load on the damper ring against the stator bearing support surface in which the axial load provides the friction damping and the radial load eliminates lost motion for maximum damping.

18 Claims, 2 Drawing Sheets

SPLIT RING WEDGE BEARING DAMPER

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to a high temperature bearing in a gas turbine engine.

2. Description of the Related Art Including Information Disclosed Under 37 CFR 1.97 and 1.98

A small gas turbine engine of the type that operates near or above 100,000 RPM requires high speed bearings to support the single or twin rotors. In a twin spool gas turbine engine, the high speed shaft requires damping for the bearings because of the excessive vibrations due to rotor dynamics issues. Without adequate damping of the bearings, the rotor shaft could not operate at these high rotational speeds and thus an engine of this small size would not be practical.

Another issue with a small gas turbine engine is that the bearings are exposed to very high temperatures because they are located near the combustor or the turbine. Prior art dampers like those made of plastics cannot be used under these extreme temperature environments. Another type of damper is needed for use in high temperature environments like those in a small gas turbine engine, and that can provide the dampening capability for these high speed rotor shafts in order to make the small gas turbine engine workable.

Another issue is a long storage life before the engine is used. For a UAV of the kind used by the US Army as a surveillance aircraft, a long shelf life of as much as 20 years is required of the engine. The engine must be capable of still operating after sitting on a shelf for up to 20 years. Plastic O-rings have been used to provide damping for bearings. However, the plastic material would degrade over time due to oxidation and even from micro-organisms growing that harm the plastic. What is needed is a long shelf life bearing damper as well.

BRIEF SUMMARY OF THE INVENTION

It is an object of the present invention to provide for a bearing with a damper that can provide damping at high-rotational speeds like that found in a small gas turbine engine.

It is another object of the present invention to provide for a bearing with a damper that can be used under extreme high temperatures like that found in a rotor shaft of a small gas turbine engine.

It is another object of the present invention to provide for a bearing with a damper that has a long shelf life.

It is another object of the present invention to provide for an aero gas turbine engine that is lighter in weight due to elimination of parts required for a bearing lubrication system such as an oil tank, a pump, a cooler and piping for lubricating or cooling the bearing.

It is another object of the present invention to provide for an aero gas turbine engine that These objectives and more are achieved with the metallic bearing friction damper of the present invention in which a bearing with a race is secured within a bearing support with a small gap between the outer race and the bearing support surface to allow for vibration of the bearing, and in which one side of the race is axially abutting a split ring damper that includes a wedge shaped surface on an opposite side from the race, and where a full annular wedge ring also with a wedge shaped surface makes contact with the split ring damper to apply an axial and a radial force to the split ring damper. The annular wedge ring is biased in an axial direction by axial springs. An axial bias to the annular wedge ring produces a force against the split ring damper in both the axial direction and the radial direction of the bearing to provide a load against the bearing race and the bearing support that functions as a friction damper for the bearing. Because the split ring damper and the annular wedge ring can be made from a high temperature resistant metallic material, the friction damper assembly of the present invention can be used in a high temperature environment that a plastic material could not. Also, because of the axial and radial loads applied to the split ring damper, a high level of damping can be achieved so that high speed rotor shafts are possible.

In other embodiments in which a long shelf life or a lower temperature environment is used, the damper ring can be made from a non-metallic material.

DETAILED DESCRIPTION OF THE INVENTION

Figure 1:
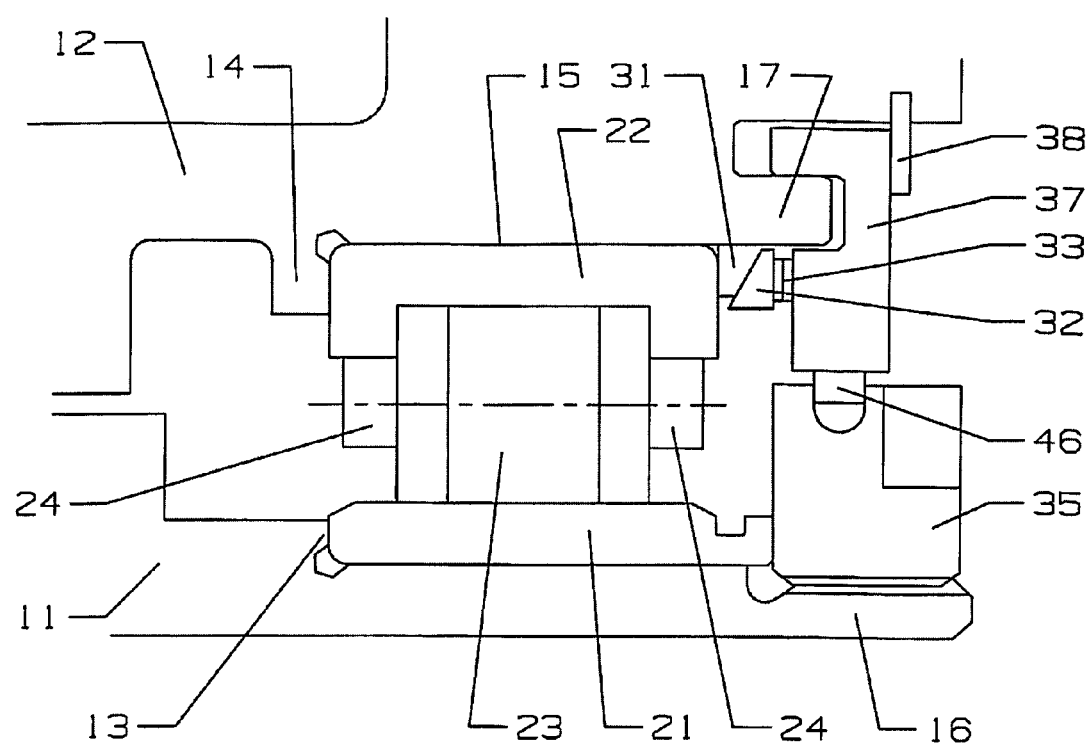
FIG. 1 shows a cross section view of the metallic bearing friction damper of the present invention.

The metallic bearing friction damper is shown in FIG. 1 and includes a rotor 11 and a stator 12 that also functions as a bearing support. A bearing with an inner race 21, an outer race 22 and a rolling element 23 (rollers, balls) and cage 24 is rotatably secured between the rotor bearing support surface and the stator bearing support surface. A small gap (deadband) 15 is formed between the bearing support surface on the stator 12 and the outer race 22 to allow for the bearing to vibrate in a radial direction.

Figure 2:
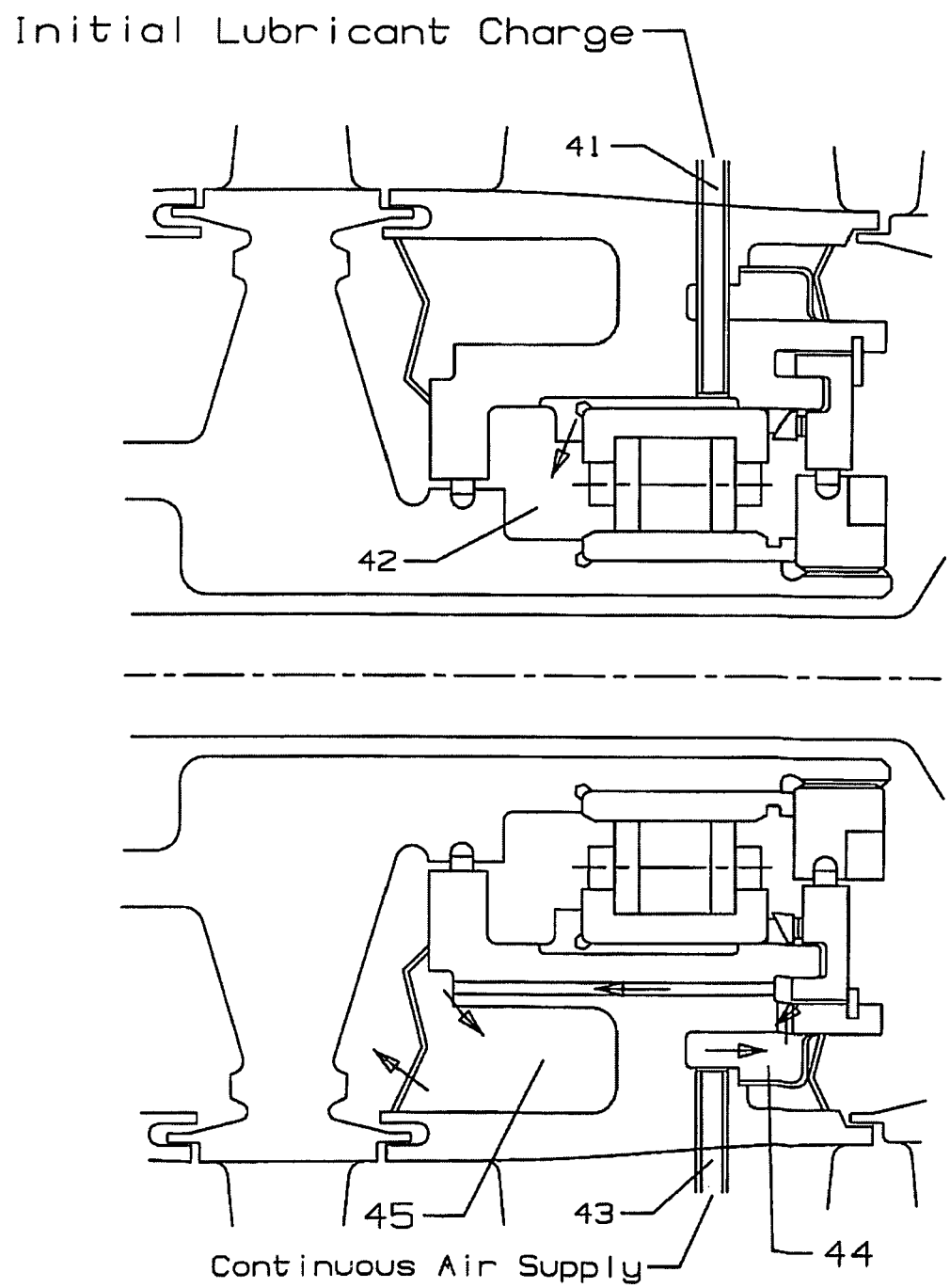
FIG. 2 shows a cross section view of the metallic bearing friction damper of FIG. 1 used in a small gas turbine engine with a lubricant and a cooling air system.

The bearing races 21 and 22 are supported against an axial movement in one direction by race support surfaces 13 and 14 formed on the rotor 11 and the stator 12. The race support surfaces 13 and 14 prevent axial movement of the races 21 and 22 to the left as shown in FIG. 2. In other embodiments, the assembly in FIG. 1 can be reversed so that the race support surfaces 13 and 14 are located on the right side of the races and the friction damper assembly is located on the left side.

The bearing inner race 21 is secured against axial movement by a threaded member 35 that screws onto threads formed on an extension 16 of the rotor 11. The inner race 21 is therefore pinched between the race support surface 13 and the threaded member 35. The outer race 22 is supported against axial movement by a split ring damper 31 that has a race abutment surface on one side and a wedge shaped surface formed on the opposite side. The split ring damper 31 also has an outer surface that abuts against the inner surface of the bearing support 12 in which the small gap 15 is formed. The split damper ring 31 can have one or more splits in it.

A full hoop wedge ring or annular wedge ring 32 includes a similar shaped wedge or slanted surface that makes contact with the wedge surface on the split ring damper 31. The wedge ring 32 includes a surface opposite to the slanted surface on which an axial spring applies an axial load to the wedge ring 32. An annular retainer ring 37 secured in place by a split ring retainer 38 secures the axial spring 33 in place and thus the friction damper assembly. An annular ring seal 46 provides a fluid seal between the threaded bolt 35 and the annular ring 37 that provides a backstop for the axial spring 33 and a cover plate for the bearing space. The threaded nut 35 screws onto the threads formed on the rotor extension 16. A stator extension 17 extends into an annular groove formed on the inner side of the annular retainer ring 37. A split ring 38 secures the annular retainer ring 37 to the stator 12. The axial spring 33 loads the wedge ring 32 against the split damper ring 31 at the conical interface, which then loads the damper ring 31 against the bearing race 22 and radially against the bearing support surface 12. The axial load provides the friction damping, and the radial load eliminates lost motion for maximum damping of the bearing. The amount of axial load applied by the axial spring 33 can be varied in order to control the amount of damping applied to the bearing race 22.

Because the split ring damper 31 and the wedge ring 32 can be made from a high temperature resistant metallic material, the friction damper can be used in high temperature environments where a plastic O-ring or other dampers cannot be used. The metallic bearing friction damper therefore makes an excellent damper for the bearing used in a gas turbine engine that operates under very high temperatures. However, in other embodiments in which the bearing damper is used in a lower temperature environment, the split ring damper 31 and the wedge ring 32 can be made of lower temperature metallic materials or even from plastic materials. The contact surfaces of the split ring damper 31 and the wedge ring 32 can even be coated with a hard coat material if warranted.

FIG. 2 shows the metallic bearing friction damper of FIG. 1 used in an aero gas turbine engine. The friction damper is the same as that show in FIG. 1 and used in the aft section of the engine near to the turbine. The friction damper is supported by an inner shroud of the stator vane located downstream from the turbine blade. a lubricant supply tube 41 extends from above and through the stator vane to a space formed around the bearing. A liquid lubricant is supplied to a bearing space 42 before the engine is started. This initial lubricant charge floats down to the lowest location within the bearing space. When the engine is started, the liquid lubricant will be forced outward by centrifugal forces and surround the outer bearing race. The liquid lubricant will turn to a mist and flow around the bearing to provide the lubrication and cooling during the engine operation. A continuous cooling air supply tube 43 is also located through a stator vane to supply cooling air around or through the walls of the bearing compartment to provide cooling to the bearing during the engine operation. The source of cooling air can be from the compressor and is flowing during the engine operation. The bearing cooling air passage follows the course of the arrows in FIG. 2 remaining separate from the air and lubricant in the bearing compartment and flows into a space 44 between the bearing support and the vane shroud, then through passages that flow between the bearing support surface and the vane shroud and then into a space 45 that then discharges into the rim cavity of the adjacent rotor blade.

The bearing lubrication system of the present invention is used for at least one mission of the aircraft. The initial lubricant charge is delivered to the bearing space before the engine is started. The initial lubricant change is enough to provide full bearing lubrication during the engine operation period. When the mission is over and the engine is serviced for the next mission, another initial lubricant charge is supplied to the bearing space. With this design, the many of the prior art lubrication supply parts are not required such as an oil tank, a pump, a cooler and piping for lubricating or cooling the bearing are not required. In an aero engine, up to 17% of the engine weight is due to the lubrication system. With each one pound of aero engine, 8 pounds of airframe are required to support the extra engine weight. Reducing the lubrication system to 10% of the engine weight will allow an even larger weight saving in the airframe as well. Thus, the overall aircraft weight can be significantly reduced. Also, the simplicity of the design allows for less chance of a critical failure from occurring. If a part of the lubricating system is damaged, for example from a bullet, the entire engine could suffer complete failure. Fewer parts used for the lubrication system results in less chance of a critical failure of the entire aircraft.

I claim the following:

1. A bearing and damper assembly comprising:
   a stator with a bearing support;
   a rotor with a bearing support;
   a bearing with an inner race supported by the rotor and an outer race supported by the stator;
   a plurality of rolling elements supported for rotation between the inner race and the outer race;
   a ring damper having a first face that abuts a side of the outer race and a second opposite face that forms a wedge surface;
   an annular wedge ring that has a first side with a wedge surface of similar slant to the ring damper wedge surface; and,
   an axial spring to apply an axial load to the annular wedge ring, which then applies an axial load to the ring damper and the outer race and a radial load to the ring damper such that the bearing is damped.

2. The bearing and damper assembly of claim 1, and further comprising:
   the wedge surfaces on the ring damper and the wedge ring are at around 60 degrees from the rotational axis of the bearing.

3. The bearing and damper assembly of claim 1, and further comprising:
   the damper ring is a split damper ring.

4. The bearing and damper assembly of claim 1, and further comprising:
   the annular wedge ring is a full annular wedge ring.

5. The bearing and damper assembly of claim 1, and further comprising:
   the damper ring and the wedge ring are formed from a metallic material.

6. The bearing and damper assembly of claim 5, and further comprising:
   the metallic material is a high temperature resistant material that can operate within a turbine of a gas turbine engine.

7. The bearing and damper assembly of claim 1, and further comprising:
   the stator and the rotor both form axial abutment surfaces for the two races to prevent axial movement of the races.

8. The bearing and damper assembly of claim 7, and further comprising:
   a threaded nut forms an axial abutment surface for the inner race; and,
   an annular retainer ring forms a support surface for the axial spring.

9. The bearing and damper assembly of claim 8, and further comprising:

an annular seal ring secured between the threaded nut and the annular retainer ring to form a seal between these two surfaces.

10. The bearing and damper assembly of claim 1, and further comprising:
a deadband gap formed between the bearing support on the stator and the outer race.

11. The bearing and damper assembly of claim 1, and further comprising:
the plurality of rolling elements is either balls or rollers.

12. The bearing and damper assembly of claim 1, and further comprising:
the bearing assembly is used in an aero gas turbine engine to support the rotor shaft on the turbine end of the rotor shaft.

13. The bearing and damper assembly of claim 12, and further comprising:
the bearing assembly is enclosed within a space between a stator vane and the rotor shaft; and,
a lubricant supply tube and passage extends through the stator vane and into the space to supply a liquid lubricant for lubricating the bearing during engine operation.

14. The bearing and damper assembly of claim 13, and further comprising:
a cooling air supply tube and passage separate from the lubricant supply tube and passage extends through another stator vane to channel cooling air to cool the bearing and then to discharge the spent cooling air into an adjacent rim cavity of the turbine.

15. The bearing and damper assembly of claim 14, and further comprising:
the engine is without an oil tank, a pump, and a lubricant cooler in order to reduce the size and lighten the weight of the engine.

16. A process of operating an aero gas turbine engine, the engine having a rotor shaft with a turbine secured to the rotor shaft, a bearing and damper assembly of claim 1 to support the turbine end of the rotor shaft, and the engine being without an oil tank, a pump, and a lubricant cooler in order to lighten the weight of the engine, the process comprising the steps of
supplying an initial lubricant charge to the bearing and damper assembly prior to starting the engine;
operating the engine such that the bearing requires lubricating and cooling;
stopping the engine after at least one mission; and,
re-supplying another initial lubricant charge to the bearing and damper assembly prior to restarting the engine.

17. The process of operating an aero gas turbine engine of claim 16, and further comprising the steps of:
supplying the initial lubricant for one mission; and,
re-supplying the initial lubricant after each mission.

18. The process of operating an aero gas turbine engine of claim 16, and further comprising the steps of:
applying an axial load to the wedge ring so that the damper ring loads axially against the outer race of the bearing and radially against the bearing support surface such that the axial load provides friction damping for the bearing and the radial load eliminates lost motion for maximum damping.

* * * * *